May 16, 1961 H. R. VITENSE ET AL 2,984,138
CUTOFF MECHANISM FOR PARTIALLY SLIT TUBULAR CAN BODIES
Filed Aug. 5, 1957 3 Sheets-Sheet 3

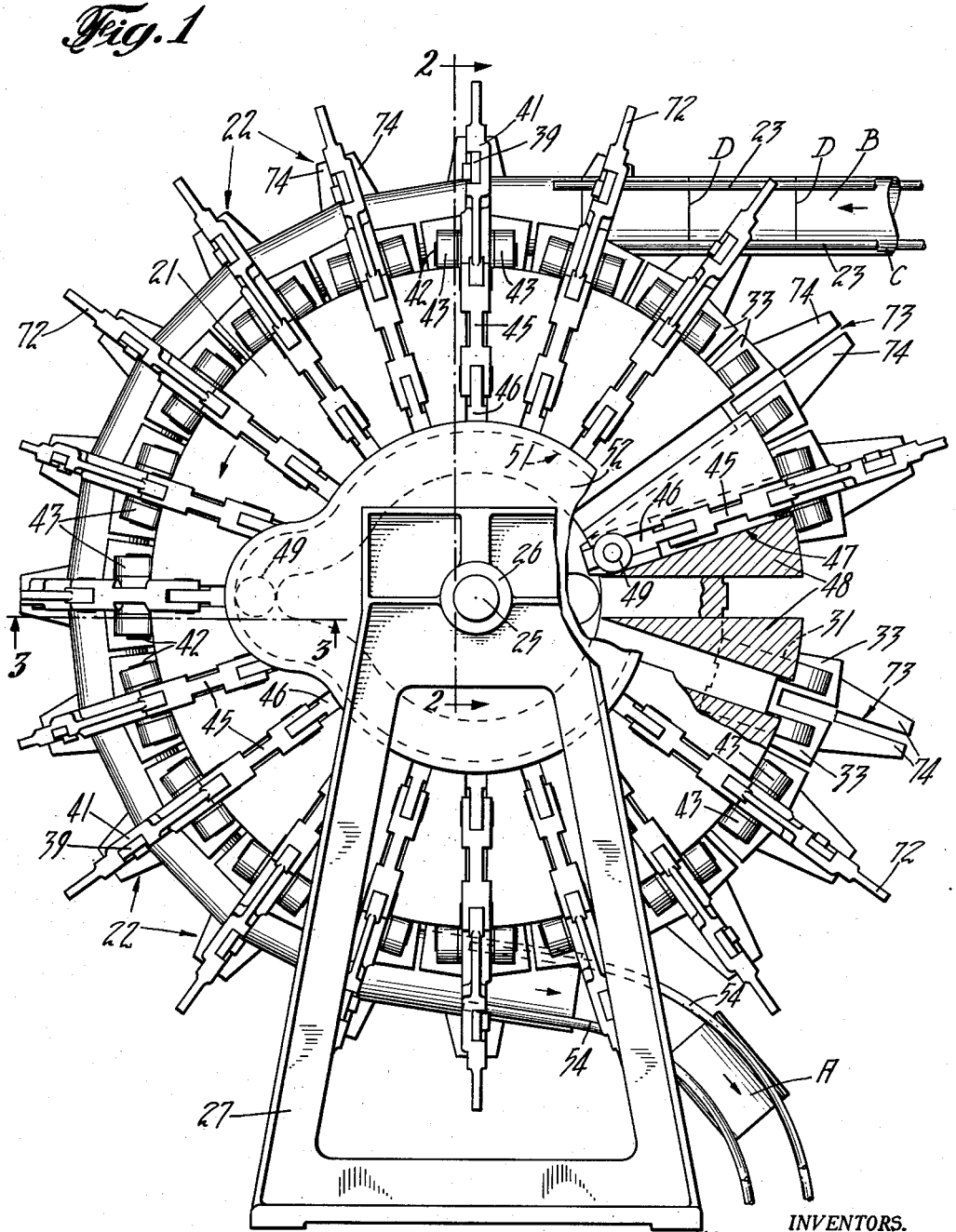

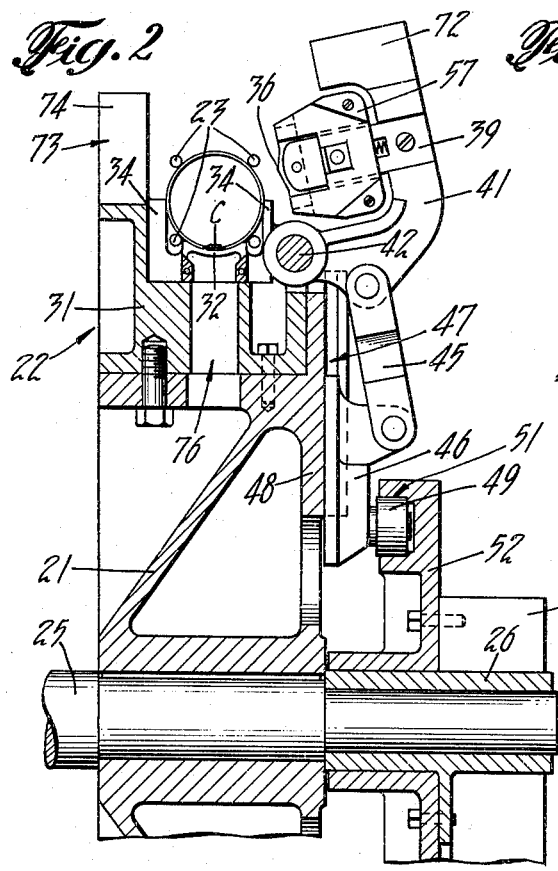
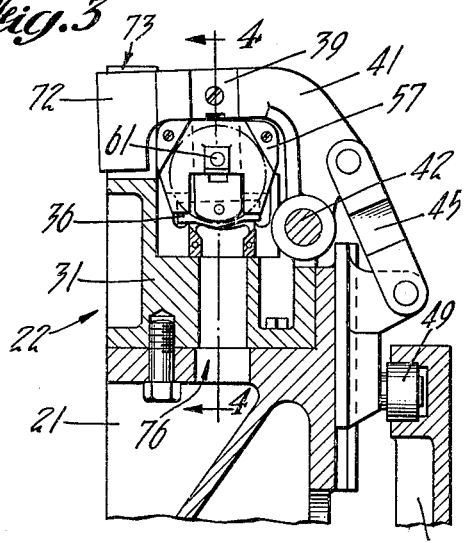
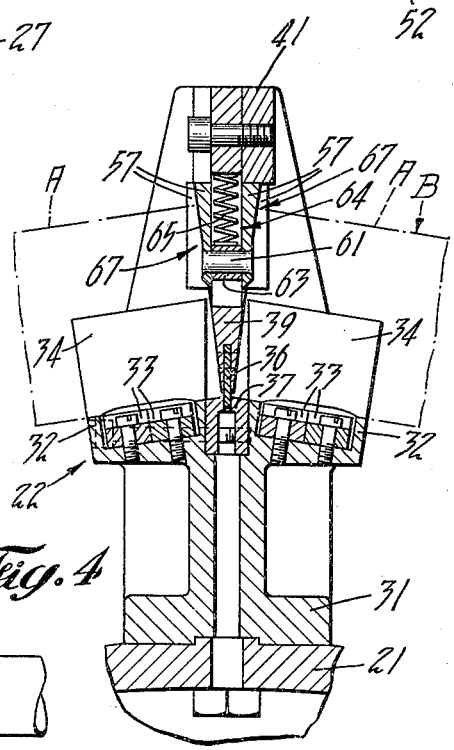
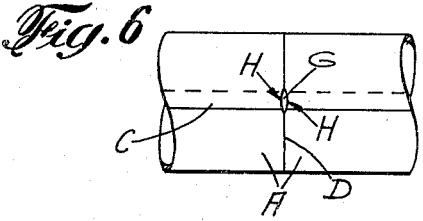
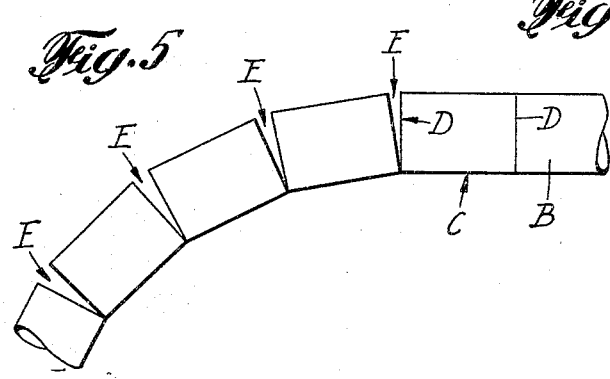

INVENTORS.
HAROLD R. VITENSE
DELBERT E. WOBBE
ROBERT M. WEYGANT
BY Charles H. Erne
Leland R. McCann
George W. Reiber
ATTORNEYS

United States Patent Office 2,984,138
Patented May 16, 1961

2,984,138

CUTOFF MECHANISM FOR PARTIALLY SLIT TUBULAR CAN BODIES

Harold R. Vitense, Mundelein, Delbert E. Wobbe, Cary, and Robert M. Weygant, Waukegan, Ill., assignors to American Can Company, New York, N.Y., a corporation of New Jersey Filed Aug. 5, 1957, Ser. No. 676,073

16 Claims. (Cl. 83—310)

The present invention relates to a cutoff mechanism and has particular reference to improved devices for severing tubular material into short lengths suitable for can or container bodies while the material is advancing along a path of travel.

This application is a companion to United States Patent Office application Serial Number 622,163 filed November 14, 1956 in the names of Lenard P. Gotsch, Harold R. Vitense and Frederick C. Baselt on Tube Cutting Method.

The present invention is applicable to the manufacture of can or container bodies by the method of producing from strip material a substantially continuous tube having a longitudinal side seam and spaced transverse slits extending partially around the tube with the exception of the side seam to hold the tube together and by subsequently cutting across the unslit or side seam portions to divide the tube into individual can bodies. Such a method and machine therefore is disclosed in United States Patent 2,444,463 issued July 6, 1948 to R. E. J. Nordquist on Method of Producing Can Bodies.

In such a method the strip material is fed into the machine continuously. Hence the various strip slitting, tube forming and body cutting operations are necessarily effected while the tube, in its various stages of formation, is advancing continuously. However considerable difficulty has been experienced in performing the body severing operation while the tube is advancing. Several devices such as flying shears and the like have been devised for this operation without commercial success because of the slow action and inaccurate cutting of such devices.

An object of the instant invention is to overcome this body severing difficulty by the provision of a cutting mechanism which is rapid in action and accurate in cutting so that the severing operation may be performed at the usual high speed rate of producing can bodies.

Another object is the provision of such a cutting mechanism which permits of the insertion of a cutting and gauging tool between adjacent can bodies to be cut apart so as to provide for proper gauging of the tool relative to the can bodies to produce accurate cutting.

Another object is to provide for a clean severance of the can bodies at the proper place to avoid irregularities and undesirable slivers on the bodies at the point of severance.

Another object is to provide for continuous advancement of the tube while the individual can bodies are being severed therefrom.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a cutting mechanism embodying the instant invention, with parts broken away and parts in section;

Figs. 2 and 3 are enlarged fragmentary sectional views taken substantially along the lines 2—2, 3—3 respectively in Fig. 1;

Fig. 4 is an enlarged fragmentary sectional view taken substantially along the line 4—4 in Fig. 3;

Fig. 5 is a schematic side elevation of a portion of a tube in a bent condition preparatory to the severance of individual can bodies therefrom;

Fig. 6 is a fragmentary bottom view of portions of two adjacent can bodies in the tube, the view showing how they are cut apart.

Figure 7:
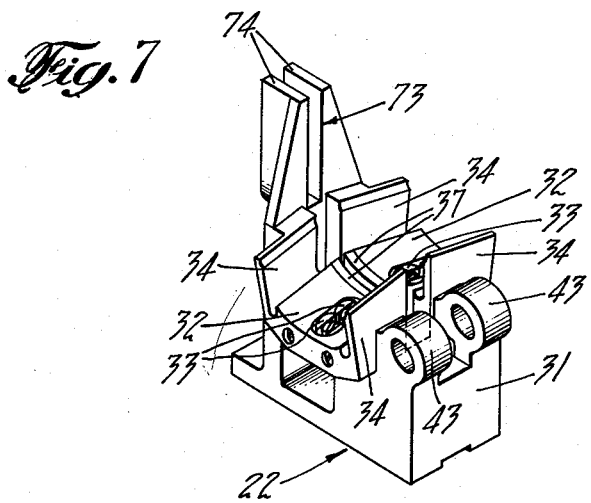
Figs. 7, 8 and 9 are enlarged fragmentary perspective views of details shown in Fig. 3.

As a preferred and exemplary embodiment of the instant invention, the drawings illustrate a cutoff mechanism for severing can bodies A (Figs. 1 and 6) from a preformed tube B (see also Fig. 5) in a continuous operation machine in which the tube is advanced continuously. The mechanism is utilized preferably in a machine in which the tube B is formed and the cutting off of the can bodies A takes place immediately upon the formation of the tube and as the tube is moving out of the forming machine.

The tube B may be made of any suitable material such as plastic, metal or fibre and may be of any desired shape such as cylindrical, square, rectangular, hexagonal, elliptical, etc. For the purposes of this specification the drawings illustrate a sheet metal tube, preferably made from strip stock and formed into cylindrical shape with its longitudinal edges secured together in a suitable side seam C which extends the full length of the tube and is produced in any suitable manner as by welding, soldering, interlocking, etc.

At spaced intervals along its length the tube B is provided with encircling slits D which divide the tube into potential can bodies A. The slits extend entirely around the tube with the exception of the side seam C, which unslit portion ties the potential bodies together to preserve the continuity of the tube so as to permit feeding of the tube into the cutoff mechanism.

In the instant invention, the cutoff mechanism receives the preformed tube B as it advances along a straight line path of travel and deflects it, along its side seam C or unslit portion, into a curvilinear path of travel while continuing its advancement as shown in Fig. 5. This changing of the direction of travel bends the tube B at its unslit portions at the slits D and thereby hinges adjacent potential can bodies A apart to produce V or wedge shaped openings E (Fig. 5) between them. While the tube continues to advance in this bent condition a cutting element of the cutoff mechanism enters the wedge shaped opening E between the leading potential can body A and the next adjacent body in the tube and cuts through the unslit portion or side seam C and thereby severs the leading can body from the tube. The severed can body is then directed to any suitable place of deposit for a subsequent operation.

The cutoff mechanism preferably comprises a rotatable wheel 21 (Figs. 1 and 2) which carries on its outer periphery in circumferential alignment a plurality of radially disposed cutoff units 22 spaced apart a distance equal to the length of the potential can bodies A to be cut from the preformed tube B, i.e. the distance between the slits D in the tube. The preformed tube B is fed continuously to the wheel 21, tangentially to its outer periphery, in time with the rotation of the wheel, in any suitable manner, along pairs of tangentially disposed straight guide rails 23 (Fig. 1). The side seam C or unslit portion of the tube is disposed adjacent the periphery of the wheel 21.

The wheel 21 preferably is mounted on a horizontally disposed shaft 25 which is rotated in any suitable manner in time with the travel of the preformed tube B. For this purpose the shaft is journaled in bearings 26 in a pair of side frames 27 which support the wheel.

Each cutoff unit 22 comprises a bed block 31 (Figs. 1, 2, 3, 4 and 7) which is secured to the outer periphery of the wheel 21. The bed block 31 is formed with a pair of spaced, circumferentially aligned straight seats 32 which are curved transversely of the wheel 21 to fit the cylindrical shape of the tube B as the tube bends around the wheel. The seats 32 also circumferentially are angularly disposed to each other in an inverted V shaped fashion to support adjacent portions of two adjacent potential can bodies with their common defining slit D located in the space between the seats, and the seats holding the two bodies in angular relation to produce the wedge shape opening E.

The opening E is formed as the leading potential can body A in the tube tangentially fed to the wheel 21 takes its place in a unit 22 and travels with the unit from the straight line direction of the guide rails 23 to the curvilinear direction of the wheel 21, thereby bending the unslit portion of the tube B at the slit D as the leading can body and the next body in line engage against the seats 32 in the unit. Permanent magnets 33 (Figs. 4 and 7) in the seats 32 hold the tube against the seats to facilitate this bending action. Vertical side walls 34 extend up from the bed block 31 along opposite sides of the seats 32 to hold the tube against lateral displacement from the seats.

The length of each seat 32, i.e. circumferentially of the wheel 21, is equal to slightly less than one half the length of a potential can body A so that a potential can body, when the tube is bent around the wheel, is supported one half on a seat of one cutoff unit 22 and the other half on the adjacent seat of the next adjacent unit. A wedge shaped opening E is thus created between adjacent potential can bodies of the tube at each unit 22 for as far as the tube extends around the wheel 21. As shown in Fig. 1 this preferably is about one half the circumference of the wheel.

While the tube B is in place on the seats 32 of the radially disposed cutoff units 22, cutting elements are moved transversely of the periphery of the wheel 21 into the wedge shaped openings E between adjacent potential can bodies to cut through the side seam C or unslit portion of the tube to sever the can bodies from the tube. This cutting action is effected preferably by a pivotally mounted shear blade or punch 36 (Figs. 3, 4 and 8) which cooperates with a stationary shear blade or die 37 disposed in a radial position in the space between the seats 32 of each cutoff unit 22. There is one die 37 and one shear blade 36 for each cutoff unit 22. The blades and dies are formed to punch out a section of material preferably an elongated, thin oval shaped section G (Fig. 6) across the unslit portion or slide seam C of the tube B to produce shallow notches H in the edges of the bodies so as to insure a clean cut, without leaving thin slivers attached to either of the two adjacent bodies when cut apart.

The shear blade 36 is secured to the inner end of a wedge shaped holder 39 which at its outer end is attached to an arm 41 (see Figs. 1, 2, 3 and 8) mounted on a short pivot pin 42 carried in a pair of spaced bearings 43 (see also Fig. 7) formed on the cutoff unit bed blocks 31 adjacent their seats 32 for pivotal movement of the arm and the blade transversely of the periphery of the wheel 21. The arm 41 is connected by a link 45 to a radial slide 46 (see also Fig. 9) which operates in a radially disposed slideway 47 formed in a flange 48 on the wheel 21. There is one of these slides 46 and slideways 47 for each cutoff unit 22. The slide 46 carries a cam roller 49 (Figs. 1, 2 and 9) which traverses a cam groove 51 of a stationary face cam 52 which surrounds the wheel shaft 25 and which is attached to one of the frames 27.

Hence as the wheel 21 rotates, the cam rollers 49 of all the cutoff units 22 traverse the cam groove 51 and at the proper time in the cycle of rotation of the wheel, the resulting movement of each roller swings the cutoff arm 41 inwardly toward the tube B, on the wheel from the normal open position as shown in Fig. 2 to the closed position shown in Fig. 3. This swing movement of the arm 41 causes the shear blades 36 to enter the wedge shaped openings E between adjacent potential can bodies in the tube B, and in cooperation with the dies 37 to cut through the unslit portion or side seam C and thus sever the can bodies as individual bodies A from the tube. This can body severing operation takes place in processional sequence as each cutoff unit 22 passes a predetermined point in the cycle of rotation of the wheel 21, so that the leading can body is cutoff first, then the next in line, and so on for as long as there is a tube on the wheel.

After severance of a can body A from the tube B, the magnets 33 in the seats 32 of the cutoff units 22, hold the body in place until it reaches a point of discharge. At this point, guide rails 54 (Fig. 1) strip the can body off the seats 32 and direct the body to any suitable place of discharge.

Provision is made for accurately locating the cut made by the shear blade 36 so that the cutting action will take place exactly at the sharp point of the wedge shaped opening E hereinbefore mentioned. For this purpose the cutting units 22 are provided with self-aligning wedge shaped gauge elements which preferably comprise a pair of generally rectangular gauge plates 57 (Figs. 2, 4 and 8) which surround and are swivelly mounted on the blade holder 39 and extend in a direction transversely of the wheel 21. The inner faces of the plates 57 are formed with coinciding clearance grooves 58 for the rectangular shape of the holder 39 and these grooves are wider than the width of the holder to permit a swivelling action of the plates. The plates preferably are secured together around the holder by screws 59 to produce a unitary gauging element. There is one of these gauging elements on each cutting unit 22.

Figure 8:
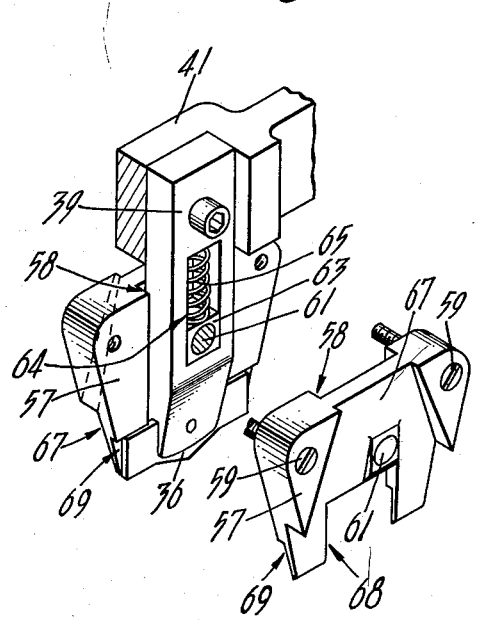
Figure 9:
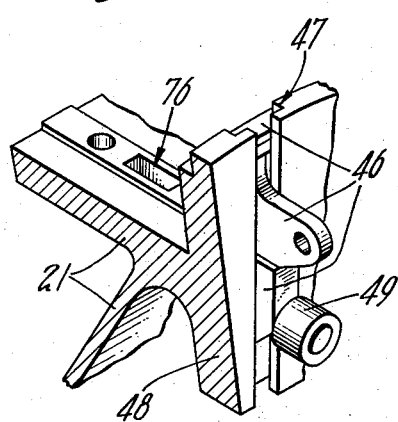

The gauging element carries a pivot or swivel pin 61 which extends through the plates 57 in a substantially centralized location and projects through a slide block 63 disposed in a slot 64 in the blade holder 39 as best shown in Figs. 4 and 8. A compression spring 65 disposed in the slot between the upper end of the slot and the slide block 63 holds the gauging element yieldably under pressure without interfering with its swivel action on the holder 39.

The outer faces of the gauging element plates 57, for an area sufficient to cover slightly more than the open end of a can body A, are cut away in tapered gauging surfaces 67 which converge along the bottom edges of the plates to produce a wedge shaped gauge which is substantially equal in shape to the wedge shape openings E between potential can bodies A in the tube B. The bottom edges of the plates 57 are provided with clearance recesses 68 for the lower end of the blade holder 39. Adjacent these recesses 68 the bottom edges of the plates 57 preferably are also formed with guiding recesses 69 for the laterally extending ends of the blade 36.

With such a swivelled gauging element attached to the blade holder 39, the tapered faces 67 of the gauge plates 57 engage against the end edges of two adjacent potential can bodies A in the tube B as the shearing blade 36 is moved into the wedge shaped opening E between the bodies and thus causes the entire gauging element to swivel on its pivot pin 61 to firstly adjust or align itself in the opening E and secondly to shift the tube B endwise, one way or the other to exactly align the wedge opening E with the wedge shaped gauging element. This results in the radial alignment of the sharp point of the wedge shaped opening E with the shearing blade 36 so that the blade will cut through the side seam C or unslit portion of the tube at the exact point where the unslit portion joins the edges of the two adjacent potential can bodies A.

In order to prevent any lateral movement of the gauging element during this gauging operation, the cutter arm 41 is provided with a locating tongue or member 72 (Figs. 1, 2 and 3) which during the cutting stroke of the arm, enters a U-shaped slot 73 disposed between a pair of upright lugs 74 on the cutting unit bed block 31 and thus is rigidly restrained against lateral movement. This in turn restrains any lateral movement of the gauge element which is carried by the arm.

Any chips that are formed during the severing action, fall through an opening 76 in the cutting unit bed blocks 22 and the adjacent portion of the wheel 21 and may be disposed of in any suitable manner as by deflection by the wheel 21 or suction device communicating with the openings 76.

Although the mechanism illustrated in the drawings shows magnets 33 in the seats 32 for holding magnetizable metallic can bodies in place after they are cut from the tube B, other well known means such as suction cups, guide rails, clamps, etc. may be substituted for the magnets 33 when the tube B is made of a nonmagnetizable material, such as aluminum, plastic, fibre, for attracting or restraining the tubing to seated position in the cutoff units 22 etc.

It is thought that the invention and many of its attendant advantages will be understood from the foregoing description, and it will be apparent that various changes may be made in the form, construction and arrangement of the parts without departing from the spirit and scope of the invention or sacrificing all if its material advantages, the form hereinbefore described being merely a preferred embodiment thereof.

We claim:

1. A cutoff mechanism for severing unslit portions of tubing having a longitudinal seam and a plurality of longitudinally spaced transverse slits each extending around the tubing leaving only the longitudinal seam portions unslit, thus dividing the tubing into short lengths, suitable for can bodies, united by the unslit seam portions, said mechanism comprising advancing means for moving said tubing longitudinally along a straight line path of travel, bending means adjacent said advancing means for receiving and changing the direction of travel of said tubing from a straight to an arcuate path of travel to bend said tubing at said unslit portions thereof, seating means on said bending means for temporarily retaining said tubing in said bent condition with adjacent lengths thereof spread apart to produce a wedge shaped opening therebetween, a cutting element reciprocally mounted adjacent said seating means for movement transversely of said arcuate path of travel of the bent tubing and through a said wedge shaped opening therein for cutting through the remaining unslit seam portion of the tubing, and gauge means yieldably mounted on said cutting element for relative movement therewith and biased toward a predetermined position relative to the cutting edge of said element, said gauge means being movable with said cutting element into said wedge shaped opening for engaging against the end edges of said adjacent lengths of tubing to align accurately said unslit seam portion with said cutting element preliminary to severance of the unslit seam portion.

2. A cutoff mechanism of the character defined in claim 1 wherein said cutting element includes a punch and is mounted for reciprocation on said bending means, and wherein a die block is mounted on said bending means in working opposition to said punch, said die block and punch having cooperating working edges shaped for punching from said unslit seam portion a thin substantially oval section to sever a can body from the tubing and to produce shallow notches in the cut ends of the seam to insure a clean cut.

3. A cutoff mechanism for severing unslit portions of tubing having transverse slits extending around the greater portion of its circumference at spaced intervals along its length to set off a plurality of short lengths of tubing united only by unslit portions, said mechanism comprising advancing means for moving said tubing along a straight line path of travel, bending means adjacent said advancing means for receiving and changing the direction of travel of said tubing from a straight line to an arcuate path of travel to bend said tubing at said unslit portions thereof with adjacent lengths of said tubing spread apart to produce a wedge shaped opening therebetween, seating means on said bending means for temporarily retaining said tubing in said bent condition, a cutting element movable transversely of said arcuate path of travel of the bent tubing and through a said wedge shaped opening for cutting through the unslit portion of the tubing, and gauge means yieldably mounted adjacent said cutting element and movable substantially simultaneously therewith into said wedge shaped opening for engaging against the end edges of said adjacent lengths of tubing to align accurately said unslit portion with said cutting element preliminary to severance of the unslit portion.

4. A cutoff mechanism of the character defined in claim 1 wherein there is a plurality of said cutoff elements connected with said bending means and means for actuating said cutoff elements in sequence for severing can body lengths from said tubing as said tubing is bent to produce said wedge shaped openings.

5. A cutoff mechanism of the character defined in claim 3 wherein said bending means is a rotatable wheel.

6. A cutoff mechanism of the character defined in claim 5 wherein said cutoff element is mounted on said wheel for travel therewith, and wherein there is provided means for actuating said cutoff element.

7. A cutoff mechanism of the character defined in claim 5 wherein there is provided a plurality of said cutoff elements mounted on said wheel at spaced intervals corresponding to the distance between said slits in said tubing, and means for actuating said cutoff elements in sequence for severing said short lengths from said tubing as said tubing is bent to produce said wedge shaped openings.

8. A cutoff mechanism of the character defined in claim 5 wherein said wheel is provided with magnetic devices for holding said tubing on said wheel.

9. A cutoff mechanism of the character defined in claim 5 wherein the seating means on said wheel comprises a plurality of bed blocks for supporting said tubing and magnetic devices in said bed blocks for holding said tubing in place.

10. A cutoff mechanism of the character defined in claim 5 wherein there is provided a plurality of said gauge means each disposed adjacent a said cutoff element and traveling with said wheel and operable in said wedge shaped openings longitudinally against adjacent ends of partially separated tubing lengths for locating each unslit portion relative to its cutoff element to insure accurate severing of said tubing at said unslit portions.

11. A cutoff mechanism of the character defined in claim 5 wherein there is provided a cutoff unit, including said cutting element, mounted on said wheel and wherein said cutoff unit includes a stationary die block and a movable blade cooperating therewith and between which said unslit portion of said bent tubing is received, and means for actuating said blade toward said die block and through said wedge shaped opening in said tubing to sever said unslit portion to separate an individual short length from said tubing.

12. A cutoff mechanism of the character defined in claim 11 wherein said die block and said blade are formed to punch out a section of material across the unslit portion of said tubing to produce shallow notches in the edges of adjacent short lengths to insure against leaving slivers on at least one of said body edges.

13. A cutoff mechanism of the character defined in claim 11 wherein said blade is mounted on an actuating arm pivotally mounted on said wheel and said arm carries a cam roller traversing a groove in a stationary cam disposed adjacent said wheel for actuating said blade.

14. A cutoff mechanism of the character defined in claim 13 wherein said gauge means is carried on said arm adjacent said blade and comprises a pivotally mounted gauge element having a wedge shape corresponding to the wedge shape of the opening between adjacent spread apart short lengths of said tubing and operable in said opening and against the end edges of said lengths adjacent to said gauge element in unison with said blade to locate said unslit portion of said tubing in alignment with said blade for accurate severing of a said length from said tubing.

15. A cutoff mechanism of the character defined in claim 14 wherein said gauge element is yieldably mounted on said arm.

16. A cutoff mechanism of the character defined in claim 13 wherein said arm is provided with a tongue extension operable in a confining member disposed in the path of travel of said arm to guide said blade into cutting position and restrain lateral displacement of said blade.

References Cited in the file of this patent

UNITED STATES PATENTS

| | | |
|---|---|---|
| Re. 13,486 | Laukhuff | Nov. 12, 1912 |
| 370,672 | Bacon | Sept. 27, 1887 |
| 955,113 | Bilgram | Apr. 12, 1910 |
| 1,665,319 | Mirfield | Apr. 10, 1928 |
| 1,740,430 | Mudd | Dec. 17, 1929 |
| 1,989,012 | Kalko | Jan. 22, 1935 |
| 2,058,046 | Vogt | Oct. 20, 1936 |
| 2,060,561 | Fausset | Nov. 10, 1936 |
| 2,326,917 | Anderson | Aug. 17, 1943 |
| 2,339,072 | Herzog et al. | Jan. 11, 1944 |
| 2,444,019 | Krueger | June 22, 1948 |
| 2,526,362 | Johnston | Oct. 17, 1950 |
| 2,753,001 | Page | July 3, 1956 |
| 2,792,623 | Melidonis | May 21, 1957 |